Sept. 19, 1939.  J. E. EWAN  2,173,159
KITCHEN UTENSIL BRACKET
Filed Jan. 16, 1939
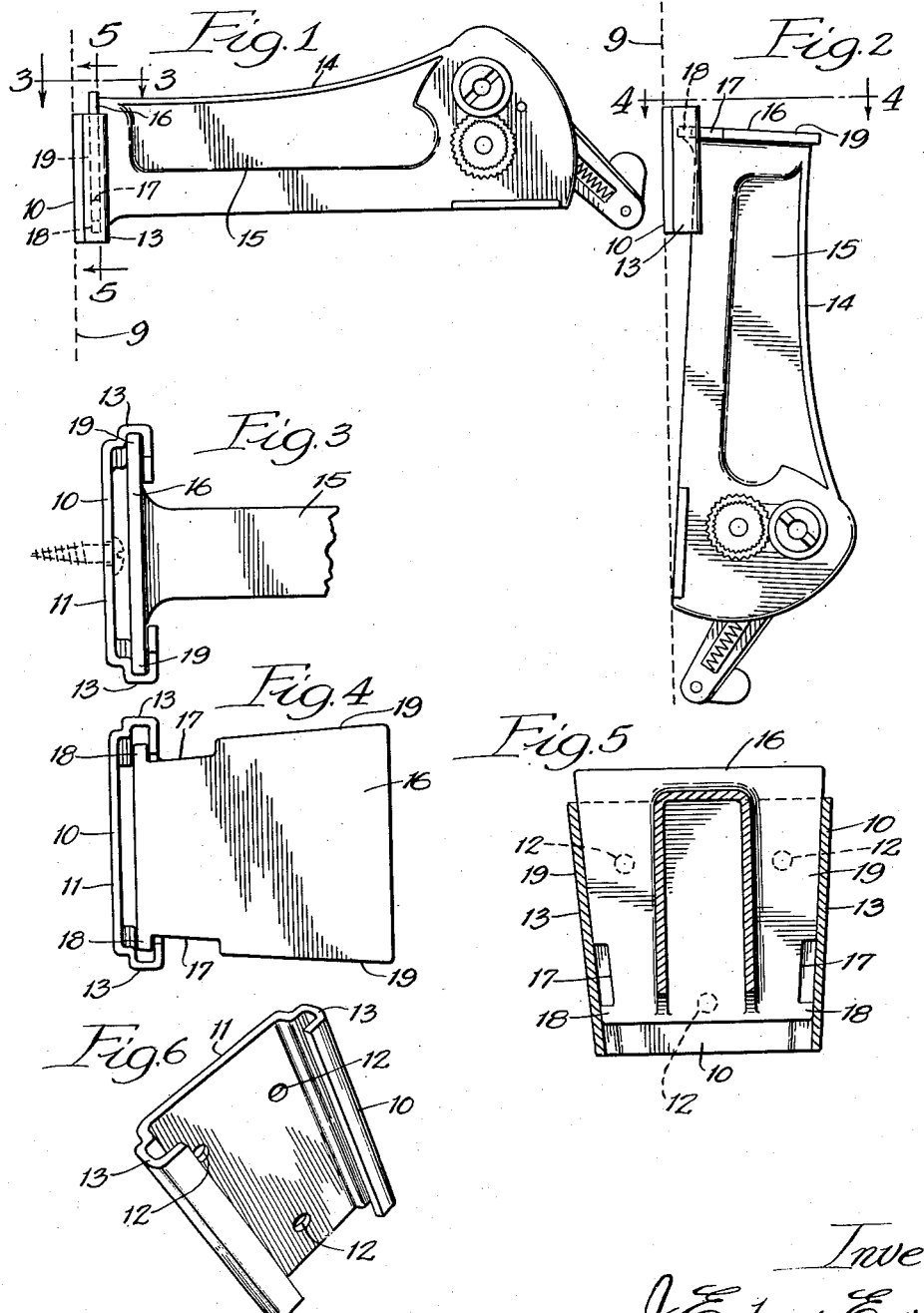
Inventor:
J. Edgar Ewan,
By Casper W. Ooms
Attorney.

Patented Sept. 19, 1939

2,173,159

UNITED STATES PATENT OFFICE

2,173,159

KITCHEN UTENSIL BRACKET

Joseph Edgar Ewan, Chicago, Ill., assignor to Vaughan Novelty Mfg. Co. Inc., Chicago, Ill., a corporation of Illinois Application January 16, 1939, Serial No. 251,111

3 Claims. (Cl. 248—224)

This invention relates to kitchen utensil brackets and has for its principal object to provide an improved bracket by which a kitchen utensil may be securely mounted upon the kitchen wall.

A further object of the invention is to provide an improved kitchen utensil bracket by means of which the kitchen utensil, when not in use, can be easily dismounted from its horizontal position and hung against the wall out of the way.

Further objects, advantages and capabilities of the invention will appear from the following description of a preferred embodiment thereof, taken in conjunction with the accompanying drawing, in which:

Figure 1 is a side elevation of the kitchen utensil bracket as employed as a mounting for a can-opener, with the kitchen utensil in operating position;

Fig. 2 is a side elevation of the kitchen utensil bracket when the kitchen utensil is removed from operating position and the bracket employed as a hanger for the kitchen utensil;

Fig. 3 is a fragmentary plan view of the bracket with the parts in the same positions as in Fig. 1 taken from line 3—3 in Fig. 1;

Fig. 4 is a fragmentary plan view of the bracket with the parts in the same position as in Fig. 2 taken from line 4—4 in Fig. 2;

Fig. 5 is a sectional elevation taken on the line 5—5 of Fig. 1;

Fig. 6 is a perspective view of the wall-plate which forms a part of the bracket.

Referring to the drawing, the reference numeral 10 designates the wall-plate, best shown in Fig. 6. This plate is formed with a flat back 11 trapezoidal in shape and perforated at 12 so that it may be screwed to the wall, indicated by the dotted line 9 in Figs. 1 and 2. Both side edges of the wall-plate are bent over to form channels 13. These channels, because of the shape of the wall-plate, approach each other and form a dovetailed recess with its narrower portion at the lower end of the wall-plate.

The kitchen utensil, which for convenience is shown in Figs. 1 and 2 as a can-opener 14 has a horizontal frame 15 terminating in a flat vertical tenon-plate 16. This plate is of dovetail shape and of a size so that it may be embraced by the flanges 13 of the wall-plate, as shown in Figs. 1, 3 and 5.

The vertical tenon-plate 16 has a notch 17 cut into each side edge near the bottom of the plate. These notches, shown in Fig. 5, divide each side edge of the tenon-plate into a flange 19 above the notch 17 and a small spur 18 at each of the lower corners of the wall-plate. These spurs are approximately square in section so that they may be received within the channels 13 with the tenon-plate 16 in either vertical position, as shown in Figs. 1, 3 and 5, or in horizontal position, as shown in Figs. 2 and 4.

The wall-plate 10 is normally fastened to the wall and flat against it, in a vertical position, as shown in Figs. 1 and 2.

When the kitchen utensil is to be used in the normal manner of its use, the tenon-plate 16 is dropped between the channels 13 of the wall-plate 10. The channels 13 closely embrace the plate 16 and securely retain it so that the kitchen utensil may be operated as if directly fastened to the wall. In use the kitchen utensil projects some distance from the wall, where it is exposed to contact and possible damage and where it may injure a person who bumps into it.

When the kitchen utensil has been used it may be lifted until flanges 19 and notches 17 in the tenon-plate 16 are clear of the upper ends of the channels 13 and only the spurs 18 remain within the channels. If the end of the kitchen utensil farthest from the wall is then tilted downward, the kitchen utensil will drop through a right angle about the spurs 18 as pivots and the spurs will remain within the channels 13. The kitchen utensil will thus be hung upon the wall-plate 10 and against the wall 9 as shown in Fig. 2.

To restore the kitchen utensil to operating position it need only be swung upwards through a right angle about the spurs 18 as pivots, until the flanges 19 can drop into the channels 13.

Although the invention has been disclosed in connection with the specific details of preferred embodiments thereof, it must be understood that such details are not intended to be limitative of the invention except insofar as set forth in the accompanying claims.

Having thus described my invention what I claim as new and desire to secure by Letters Patent is:

1. A kitchen-utensil bracket comprising a vertical wall-plate with channels thereon, a tenon-plate for reception within said channels, said tenon-plate having each side edge notched so as to form a flange thereon and a spur thereon.

2. A kitchen-utensil bracket comprising a vertical wall-plate, channels thereon, a tenon-plate for reception within said channels, and spurs on said tenon-plate for retention within said channels when said tenon-plate is removed therefrom.

3. A kitchen-utensil bracket comprising a wall-plate, a channel on each side edge thereof, a tenon-plate for reception between said wall-plate channels, spurs on said tenon-plate whereby said tenon-plate can be hung from said well-plate with only said spurs between said wall-plate channels.

JOSEPH EDGAR EWAN.